United States Patent
Knowles et al.

(10) Patent No.: US 9,996,396 B2
(45) Date of Patent: *Jun. 12, 2018

(54) CROSS ARCHITECTURE VIRTUAL MACHINE MIGRATION

(71) Applicant: International Business Machines Corporation, Armonk, NY (US)

(72) Inventors: Paul Knowles, Manchester (GB); Adam James McNeeney, Manchester (GB); Henry Paul Nash, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/159,725

(22) Filed: May 19, 2016

(65) Prior Publication Data

US 2016/0266937 A1    Sep. 15, 2016

Related U.S. Application Data

(63) Continuation of application No. 14/639,007, filed on Mar. 4, 2015, now Pat. No. 9,372,727, which is a
(Continued)

(30) Foreign Application Priority Data

Apr. 26, 2010    (EP) .................................... 10161001

(51) Int. Cl.
*G06F 9/50*        (2006.01)
*G06F 9/455*       (2018.01)
(Continued)

(52) U.S. Cl.
CPC ........ *G06F 9/5055* (2013.01); *G06F 9/45558* (2013.01); *G06F 9/461* (2013.01);
(Continued)

(58) Field of Classification Search
None
See application file for complete search history.

(56) References Cited

U.S. PATENT DOCUMENTS

| 5,560,013 A | 9/1996 | Scalzi et al. |
| 7,415,701 B2 | 8/2008 | Wang et al. |

(Continued)

FOREIGN PATENT DOCUMENTS

| CN | 100390742 | 5/2008 |

OTHER PUBLICATIONS

Bellard, "QEMU, a Fast and Portable Dynamic Translator," Proceedings of the Freenix/Open Source Track, dated 2005, Berkeley, CA, Total 6 pages.

(Continued)

*Primary Examiner* — Qing Yuan Wu
(74) *Attorney, Agent, or Firm* — David W. Victor; Konrad, Raynes, Davda and Victor LLP

(57) ABSTRACT

Provided are a computer program product, system, and method for transferring a virtual machine from a first server to a second server. A first enhanced system translator executing on the first server includes a first virtual machine interface to interface with a first instance of the virtual machine on the first server and a first convert state component. A second enhanced system translator executing on the second server includes a second virtual machine interface to interface with a second instance of the virtual machine and a second convert state component. The first convert state component converts a state of the first instance of the virtual machine to a first instruction set architecture and the second convert state component converts the first instructions set architecture to a second instruction set architecture for use by the second instance of the virtual machine to run on the second server.

17 Claims, 7 Drawing Sheets

Related U.S. Application Data continuation of application No. 13/077,713, filed on Mar. 31, 2011, now Pat. No. 8,984,507.

(51) Int. Cl.
*G06F 9/46* (2006.01)
*G06F 9/48* (2006.01)
*H04L 29/08* (2006.01)

(52) U.S. Cl.
CPC .......... *G06F 9/4856* (2013.01); *G06F 9/5088* (2013.01); *H04L 67/1008* (2013.01); *G06F 9/4812* (2013.01); *G06F 2009/4557* (2013.01); *G06F 2009/45562* (2013.01)

(56) References Cited

U.S. PATENT DOCUMENTS

| | | |
|---|---|---|
| 7,484,208 B1 | 1/2009 | Nelson |
| 7,634,768 B2 | 12/2009 | Chen et al. |
| 7,885,946 B2 | 2/2011 | Carr et al. |
| 7,987,464 B2 | 7/2011 | Day et al. |
| 8,405,666 B2 | 3/2013 | Masood |
| 2006/0069703 A1 | 3/2006 | Carr et al. |
| 2007/0283348 A1 | 12/2007 | White |
| 2008/0307213 A1 | 12/2008 | Sekiguchi et al. |
| 2009/0007106 A1 | 1/2009 | Araujo, Jr. et al. |
| 2009/0249366 A1 | 10/2009 | Sen et al. |

OTHER PUBLICATIONS

Chen, "When Virtual Is Better Than Real," Proceedings of the Eighth Workshop on Hot Topics on Operating Systems, dated 2001, Piscathaway, NJ, Total 6 pages.

Cifuentes et al., "UQBT: Adaptable Binary Translation at Low Cost", Downloaded on Dec. 17, 2009, University of Queensland, Total 7 pages.

Scott et al., "Retargetable and Reconfigurable Software Dynamic Translation", dated 2003, IEEE Computer Society, Proceedings of the International Symposium on Code Generation and Optimization, Total 12 pages.

M. Tzanidakis, "How to suspend and hibernate a laptop under Linux", dated Jun. 6, 2006, (online) retrieved from the Internet at URL>http://www.linux.com/news/hardware/laptops/8253-how-to-suspend-and . . . ,Total 6 pages.

IBM, "IBM PowerVM Virtualization Introduction and Configuration", dated Jun. 2013, International Technical Support Organization, IBM PowerVM Virtualization Introduction and Configuration, Total 786 Pages.

Scott et al., "Overhead Reduction Techniques for Software Dynamic Translation", (IPDPS 2004),18th International Parallel and Distributed Processing Symposium, Total 8 pages.

Cifuentes et al., "Walkabout—A Retargetable Dynamic Binary Translation Framework", dated 2002, Sun Microsystems Laboratories, Total 13 pages.

Lin et al., "SLYK: A Transparent Fault-Tolerant Migration Platform", dated 2005, Distributed Computer Systems Final Project, Total 7 pages.

IBM, "IBM PowerVM Live Partition Mobility", dated Mar. 2009, International Technical Support Organization, IBM PowerVM Live Partition Mobility, Total 312 pages.

"Microsoft Acquires Connectix Virtual Machine Technology", dated Feb. 19, 2003, Microsoft Acquires Connectix Virtual Machine Technology. Total 3 pages.

"KVM", dated Jun. 9, 2009, (online), retrieved from the Internet at URL>http://www.linux-kvm.org/wiki/index.php?title=Migration&oldid=2330 . . . , Total 5 pages.

"VMware VMotion", dated 2009, Live Migration for Virtual Machines Without Service Interruption, Total 2 pages.

U.S. Pat. No. 7,885,946 is English counterpart to CN100390742.

Publication 20060069703 is English counterpart to CN100390742.

US Patent Application, dated Mar. 31, 2011, for U.S. Appl. No. 13/077,713 (37.313), filed Mar. 31, 2011, invented by Paul Knowles et al., Total 45 pages.

Office Action, dated Mar. 27, 2014, for U.S. Appl. No. 13/077,713 (37.313), filed Mar. 31, 2011, invented by Paul Knowles et al., Total 13 pages.

Response to Office Action, dated Jun. 27, 2014, for U.S. Appl. No. 13/077,713 (37.313), filed Mar. 31, 2011, invented by Paul Knowles et al., Total 13 pages.

Supplemental Amendment, dated Jul. 8, 2014, for U.S. Appl. No. 13/077,713 (37.313), filed Mar. 31, 2011, invented by Paul Knowles et al., Total 8 pages.

Notice of Allowance, dated Jul. 24, 2014, for U.S. Appl. No. 13/077,713 (37.313), filed Mar. 31, 2011, invented by Paul Knowles et al., Total 9 pages.

Notice of Allowance, dated Nov. 3, 2014, for U.S. Appl. No. 13/077,713 (37.313), filed Mar. 31, 2011, invented by Paul Knowles et al., Total 13 pages.

Onoue, "A Virtual Machine Migration System Based on a CPU Emulator", dated 2006, Second International Workshop on Virtualization Technology in Distributed Computing(VTDC 2006), Total 8 pages.

International Search Report, dated Jul. 25, 2011, for PCT/EP2011/056192, Total 4 pages.

Written Opinion of the International Searching Authority, dated Jul. 25, 2011, for PCT/EP2011/05692, Total 4 pages.

International Preliminary Report on Patentability, dated Oct. 30, 2012, for PCT/EP2011/056192, Total 4 pages.

US Patent Application, dated Mar. 4, 125, for U.S. Appl. No. 14/639,007 (37.313C1), filed Mar. 4, 2015, invented by Paul Knowles et al., Total 48 pages.

Office Action, dated Dec. 1, 2015, for U.S. Appl. No. 14/639,007 (37.313C1), filed Mar. 4, 2015, invented by Paul Knowles et al., Total 12 pages.

Response to Office Action, dated Mar. 1, 2016, for U.S. Appl. No. 14/639,007 (37.313C1), filed Mar. 4, 2015, invented by Paul Knowles et al., Total 10 pages.

Notice of Allowance, dated Mar. 29, 2016, for U.S. Appl. No. 14/639,007 (37.313C1), filed Mar. 4, 2015, invented by Paul Knowles et al., Total 14 pages.

Onoue et al., "A Virtual Machine Migration System Based on a CPU Emulator", dated 2006, Compute Society, Second International Workshop on Virtualization Technology on Distributed Computing,Total 8 pages.

Examination Report, dated Feb. 4, 2017, for Application No. GB1220970.6, Ref No. GB920100007GB1, Total 4 pages.

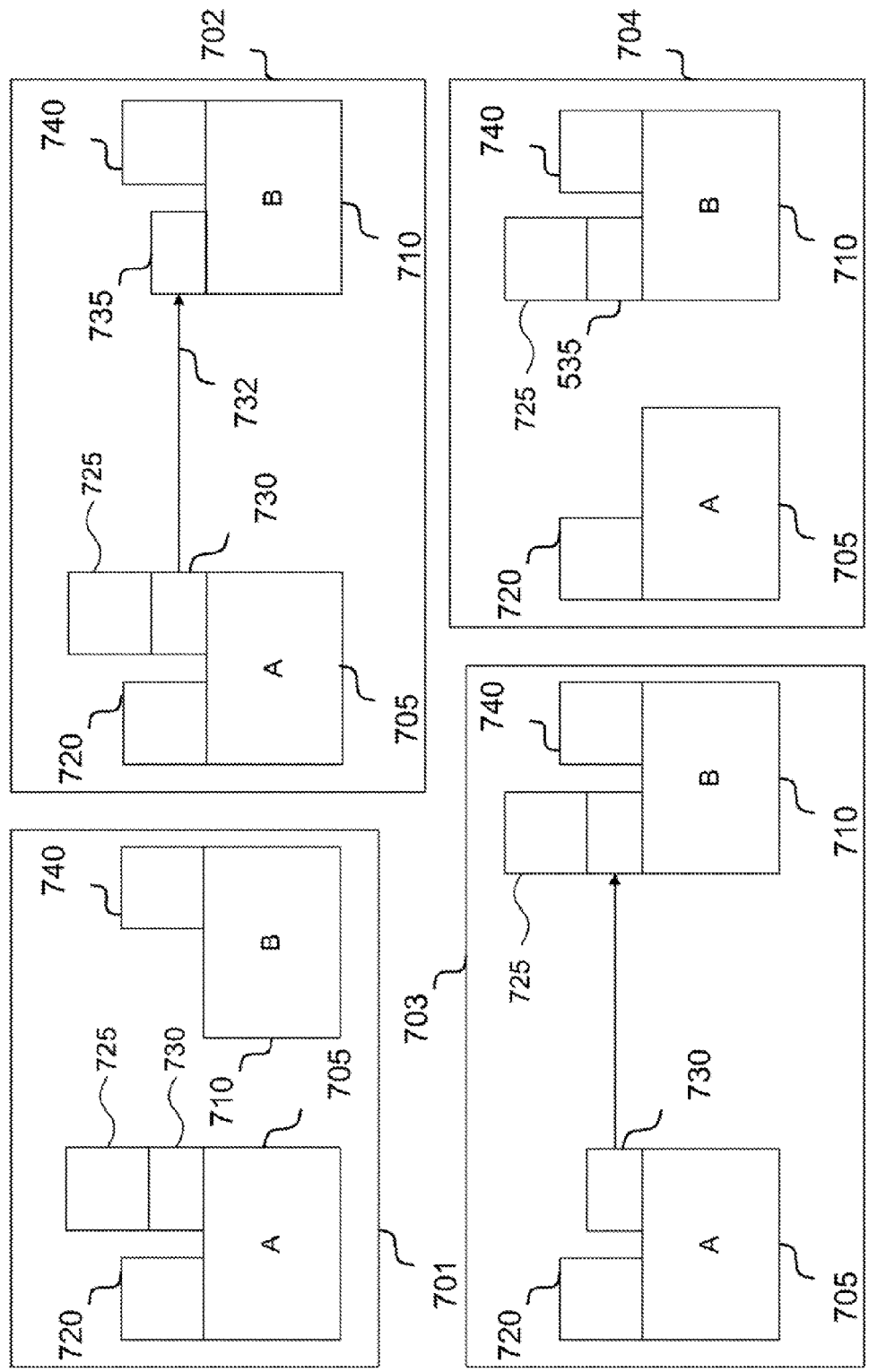

CROSS ARCHITECTURE VIRTUAL MACHINE MIGRATION

CROSS-REFERENCE TO RELATED APPLICATION

This application is a continuation of U.S. patent application Ser. No. 14/639,007, filed Mar. 4, 2015, which is a continuation of U.S. Pat. No. 8,984,507, issued on Mar. 17, 2015, which patent and patent application are incorporated herein by reference in their entirety The invention relates to computer virtual machines. In particular, the invention relates to an apparatus, method, and computer program product for migrating a virtual machine across different architectures.

BACKGROUND

A virtual machine (VM) is a software implementation of a physical computer. Computer programs designed to execute on the physical machine execute in a similar way when executed on a VM. A VM provides a complete system platform to support a full operating system (OS). A physical machine can be shared between users by using different VMs, each running a different OS.

Modern processor architectures have enabled virtualization techniques that allow multiple operating systems and VMs to run on a single physical machine. These techniques use a hypervisor layer that runs directly on the physical hardware and mediates accesses to physical hardware by providing a virtual hardware layer to the operating systems running in each virtual machine. The hypervisor can operate on the physical machine in conjunction with a 'native VM'. Alternatively, the hypervisor can operate within an operating system running on the physical machine, in conjunction with a 'hosted VM' operating at a higher software level.

Examples of VM technology are:
Linux Kernel-Based Virtual Machine (KVM) allows one or more Linux or Windows virtual machines to be run on top of an underlying Linux that runs KVM.
Xen allows a guest (virtualized) Linux to be run on top of Linux.
Parallels allows Linux and Windows on top of Mac OS X.
VMWare allows Linux and Windows systems on top of Mac OS X, Windows and Linux systems.

A user may want to migrate a workload operating on one physical machine (host A) to another physical machine (host B), for example, for machine maintenance or for performance optimisation. If the instruction set architecture is the same on both host A and host B, the VM needs to be shut down on host A, restarted on host B, and the workload migrated. However, if the ISA on each physical machine is different, a migration is problematic, because, far example, the format state of the VM on host A is inappropriate for the format state of the VM on host B.

BRIEF SUMMARY

Exemplary embodiments of the invention relate to the management of resources in a multiprocessing system. One aspect of the invention concerns a system for transferring a running virtual machine from a first physical machine to a second physical machine where each of the physical machines has a different instruction set architecture. The system may comprise a receiver for receiving a transfer request; responsive to receiving the transfer request, means for pausing the virtual machine; means for collecting a state of the virtual machine; means for stopping a first interface component operable on the first physical machine, wherein the first interface component is operable to interface between the virtual machine and the first physical machine; means for starting a second interface component operable on the second physical machine, wherein the second interface component is operable to interface between the virtual machine and the second physical machine; means for transferring the state to the second interface component; and, responsive to the state transfer, means for starting the virtual machine on the second physical machine.

A second aspect of the invention concerns a method for transferring a running virtual machine from a first physical machine to a second physical machine where each of the physical machines has a different instruction set architecture. The method may comprise receiving a transfer request; in response to receiving the transfer request, pausing the virtual machine; collecting a state of the virtual machine; stopping a first interface component operable on the first physical machine, wherein the first interface component is operable to interface between the virtual machine and the first physical machine; starting a second interface component operable on the second physical machine, wherein the second interface component is operable to interface between the virtual machine and the second physical machine; transferring the state to the second interface component; and, in response to the state transfer, starting the virtual machine on the second physical machine.

A third aspect of the invention concerns a computer program product for managing a multiprocessing computer system. The computer program product comprises a computer readable storage medium having computer readable program code embodied therewith. The computer readable program code may comprise program code configured to cause the computer system to perform all the steps of the method of the second aspect, when the computer loads and executes the program code.

The details of the preferred embodiments of the invention, both as to its structure and operation, are described below in the Detailed Description section in reference to the accompanying drawings. The Summary is intended to identify key features of the claimed subject matter, but it is not intended to be used to limit the scope of the claimed subject matter.

BRIEF DESCRIPTION OF THE SEVERAL VIEWS OF THE DRAWINGS

Exemplary embodiments of the invention will now be described by way of example only, with reference to the accompanying drawings, in which:

FIG. 7 is a block diagram depicting configurations of source server and target server in four stages of the method of FIG. 6.

DETAILED DESCRIPTION

Figure 1:
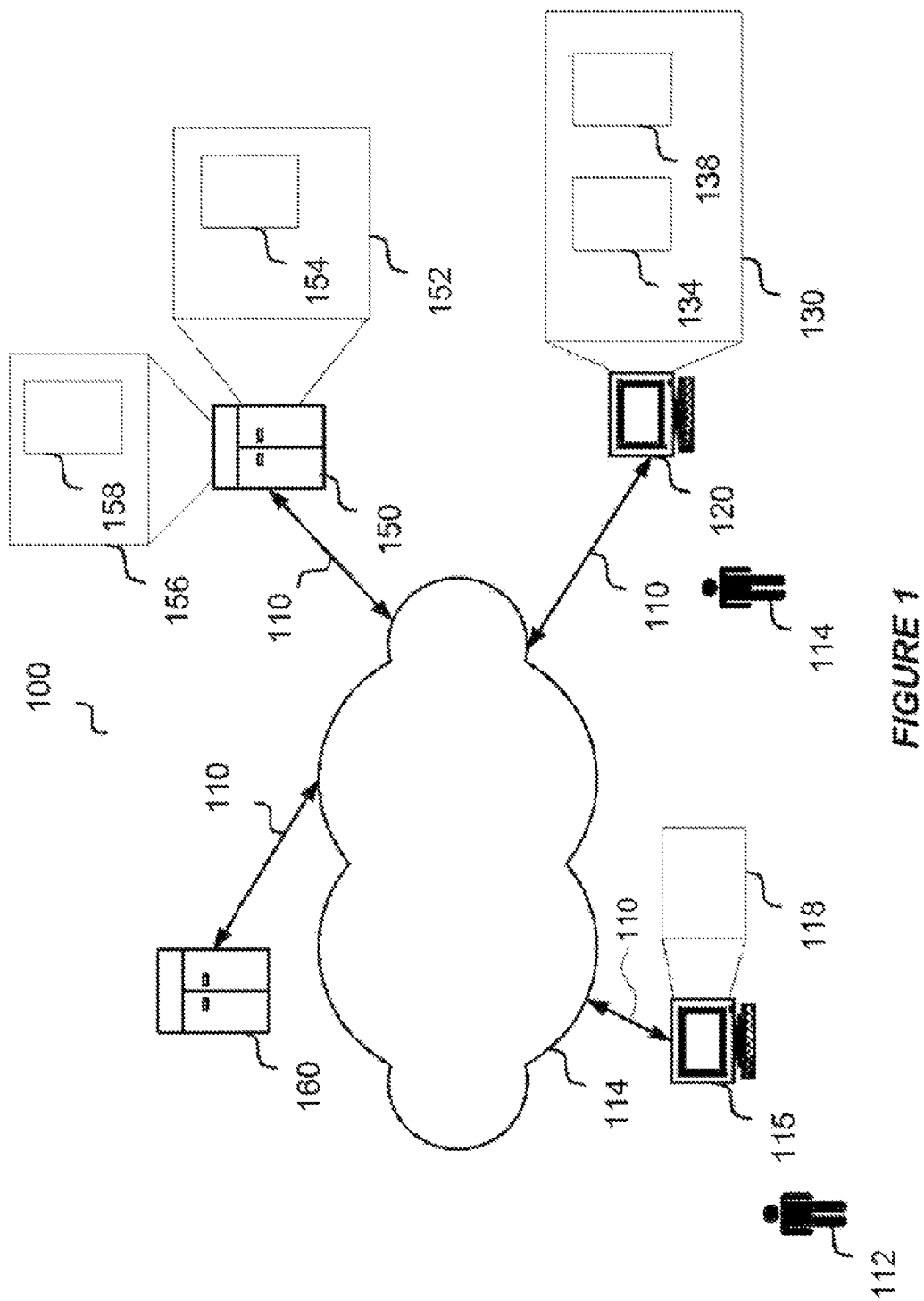
FIG. 1 is a block diagram of a data processing system in which an embodiment of the invention may be implemented.

Exemplary embodiments of the invention relate to a system, method, and computer program product for communicating between a hardware resource layer of a complex computing system and a routing layer so that, in spite of an intervening virtualization layer, hardware resource policies may be enacted in the system without significantly impacting the operation of dynamic routing of application task workloads.

There are a number of methods that can be applied to complete this. One method uses system translators for the two physical machines (hosts A and B) to run virtual machines. The method comprises:

Shutting down a virtual machine on host A;
Transferring or reattaching storage to host B;
Setting up a new equivalent virtual machine on host B; and
Starting the new virtual machine on host S.

Such a transfer is permanent and cannot easily be reversed without repeating the whole method in the opposite direction. In addition, the transfer is of a virtual machine that is shut down rather than one that is running. System availability is lost during the transfer and it may take days or weeks to successfully complete the transfer.

Another method uses application translators, which run user applications without the operating system on which the application originally ran. This allows moving a workload from one architecture to another given the correct application translator. The transfer of a workload from one architecture to another is not straightforward and requires knowledge of the configuration and file layout of the original system.

Yet another method to move from one architecture to another (or indeed one operating system to another) is to port the software running the workload. The transfer of a workload from one architecture to another is not straightforward and requires deep knowledge of the workload to be transferred. Porting software is a costly and time-consuming exercise, and may not be viable for many workloads.

In another method, certain central processing units (CPUs) can be put into a mode such that they appear to be a different kind of CPU. This allows workloads to be moved from an older processor to a newer one without changing any of the software as the new machine can emulate the old CPU. However, this relies on the CPU manufacturer providing this capability. The capability to emulate another CPU is normally only available for earlier revisions of a CPU architecture, rather than completely disparate architectures. The capability is provided in hardware rather than software and therefore can only be added during the design and implementation of the CPU rather than at a later date when a business need is found.

In an alternative solution, some operating systems provide a capability to have a partitioned area within them that can emulate a different operating system. This virtualization allows moving a workload that was built on an earlier operating system within a more modern system. However, this solution does not provide cross-architecture mobility of workloads. Many workloads are incompatible with this approach; moving a workload into a partition from real hardware or even a system-level virtualized machine requires the machine to be shutdown fully; and, only some operating systems allow a partition to be migrated to another machine whilst running.

Support to suspend the operation of a running machine and capture the state such that it can be resumed later has been built into a number of modern operating systems and is known as 'Hibernation' and 'Safe Sleep' amongst other names. The operation of the machine is suspended and the state of the RAM and other devices is stored to hard disk or other permanent storage. Later the state can be resumed by reading the state from storage and, restarting the machine. In this (non-virtualized) environment suspend and resume requires co-operation from the operating system. This provides serialization of machine state, suspension and resumption of machine state, and the ability to completely power off the physical machine between the suspension and resumption operations.

However, it does not provide an ability to move machine state from one physical machine to another, nor an ability for physical hardware to be changed between suspend and resume.

Typically, an OS supplies a low-power mode for laptops and other similar devices. In this mode, the system state is saved to Random Access Memory (RAM) and the processor is shutdown. This process requires co-operation from the operating system in order to work correctly. This provides serialization of machine state, and suspension and resumption of machine state. However, this does not provide: an ability to completely power off the physical machine between the suspend and resume operations an ability to move machine state from one physical machine to another; or, an ability for physical hardware to be changed between suspension and resumption.

In a virtualized environment, suspending and later resuming machine state can be achieved without co-operation from the running operating system the state of the virtual devices and RAM can be stored and later resumed without the operating system knowing that this occurred. For some virtualization products, it is possible for the machine state to be resumed on a different physical host. However, this is currently limited to be the same instruction set architecture to the source physical host, because the software has not been designed with the functionality in mind. Therefore, the implementation is tied to running a particular OS/ISA combination rather than having the flexibility to move to a different ISA.

There have been various examples of emulating one instruction set architecture on another physical machine. Emulation allows:

Functionality to be preserved when hardware ceases to be available;
New technology to be taken advantage of without expensive software rewrites;
Hardware under development to be tested;
Multiple operating systems to run on a single physical machine.

One technique for providing emulation of one instruction set architecture is to use dynamic binary translation. In order to support this technology, one set of hardware and the corresponding instruction set architecture must be emulated on another distinct machine. Dynamic binary translators provide a significant speed benefit over traditional emulators which simply interpret each instruction. Instead, groups of instructions are translated from the application to work directly on the host ISA. An example of a cross-platform virtualization product is QuickTransit, which allows applications compiled for one specific processor and operating system to be executed on a different processor and/or operating system without altering the original application. One of the technologies used in QuickTransit is a dynamic binary translator. This takes the original application and translates instructions and system calls to work correctly with the new instruction set and operating system. Dynamic binary translators provide a significant speed benefit over traditional emulation which simply interpret each instruction.

Referring now to the drawings and in particular to FIG. 1, there illustrated a block diagram depicting a data processing system 100 in which an embodiment of the invention may be implemented. The data processing system comprises workstations 115, 120, and servers 150, 160. The workstations 115, 120, and the servers 150, 160 are connectable through a network 114, which may comprise wired networks 110. Workstations 115, 120 comprise different instruction set architectures (ISAs).

Server 150 comprises two virtual machines (VMs) 152, 156 that are running different operating systems. Applications 154, 158 are operable on the VMs 152, 156. The user 114 accesses the applications 154, 158 by interacting with control programs 134, 138 respectively on the workstation 120. An administrator 112 controls the data processing system 100 through a maintenance control program 118 operable on the workstation 115. In an alternative embodiment, the workstation 115 is directly connected to a server 150, 160.

Figure 2:
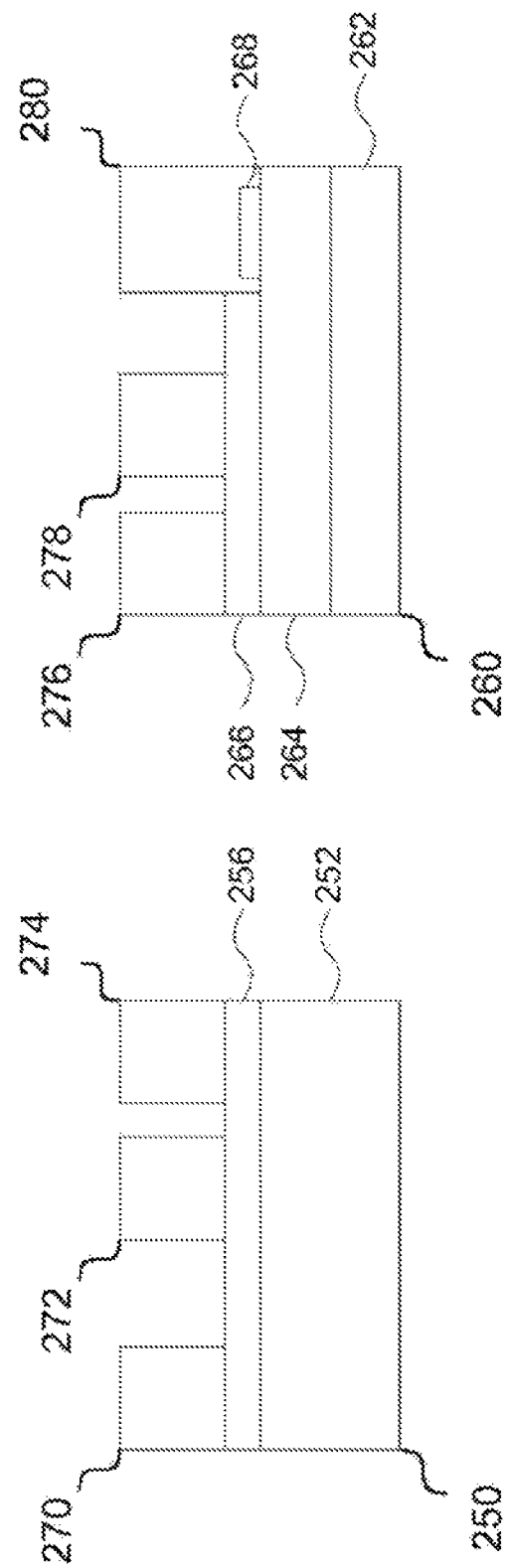
FIG. 2 is a block diagram depicting two physical servers in which an embodiment of the invention may be implemented.

FIG. 2 is a block diagram depicting two physical servers 250, 260 in which an embodiment of the invention may be implemented. A hypervisor 256 is operable on the physical hardware 252 of physical server 250 and allows native VMs 270, 272, 274 to run on top of it. The VMs 270, 272, 274 are each isolated from each other and are operable as if they are running on an entire real system. The hypervisor 256 emulates hardware for each VM 270, 272, 274 such that when the VM 270, 272, or 274 wishes to access its virtualised hardware devices (for example, an Ethernet card, or Small Computer System Interface (SCSI) controller), the hypervisor 256 intercepts these instructions and converts them to accesses to physical hardware 250.

An operating system (OS) 264 is operable on the physical hardware 262 of physical server 260. A hypervisor 266 is operable on the OS 264, Guest VMs 276, 278 are operable on the hypervisor 256, VM 280 is operable on the OS 264.

A System Translator (ST) 268 is a software component that allows a whole system (OS 264 and applications 154, 158) that as designed for one ISA (for example, Sun™ SPARC™) to run on a different ISA system (for example IBM® POWER6®). (Sun is a trademark of Sun Microsystems, Inc. or its subsidiaries in the United States and other countries. All SPARC trademarks are used under license and are trademarks or registered trademarks of SPARC International, Inc. in the United States and other countries. Products bearing SPARC trademarks are based upon an architecture developed by Sun Microsystems, Inc. IBM and POWER6 are trademarks of International Rosiness Machines Corporation in the United States, other countries, or both.) The ST 268 sits as a layer between the VM 280 and the physical hardware 262.

As depicted in FIG. 2, the ST 268 is operable within an operating system (not shown) in the guest VM 280. In this case, the OS 264 and a userspace program are started that provide the system translation functionality. The ST 268 provides a similar service for a single VM 280, as a hypervisor 256, 266 provides for multiple VMs 270, 272, 274, 276, 278, 280 running on a physical machine 250, 260. The ST 268 emulates hardware in the same way as a hypervisor 256, 266, but for hardware for a different architecture. In addition, the ST 268 translates instructions that the VM 280 wishes to execute. System translators use dynamic binary translation to convert machine instructions from one ISA to another. Hardware emulation is also used so that the entire machine is emulated and entire system images can run unaltered.

In an alternative embodiment, the ST 268 may operate as part of the hypervisor 266. In another embodiment, the ST 268 may operate directly on the hypervisor 266. In this embodiment, the ST 268 acts like an OS that runs in VM 270, 272, 274, 276, 278, or 280. In alternative embodiments, the ST 268 is operable within the native OS 264 as a layer above the native OS 264, or between a VM 270, 272, 274, 276, 278, or 280 and the physical hardware 252, 262.

Functions of a ST 268 in normal operation comprise translating instructions and emulating hardware. Translating instructions use dynamic binary translation to execute the instructions required by the VM 280 on a different physical architecture. Emulation of hardware provides a mechanism by which hardware that the translated OS expects to be present is emulated. This includes, for example, network cards, memory controllers, interrupt controllers, read only memories (ROMs), and random access memory (RAM).

Figure 3:
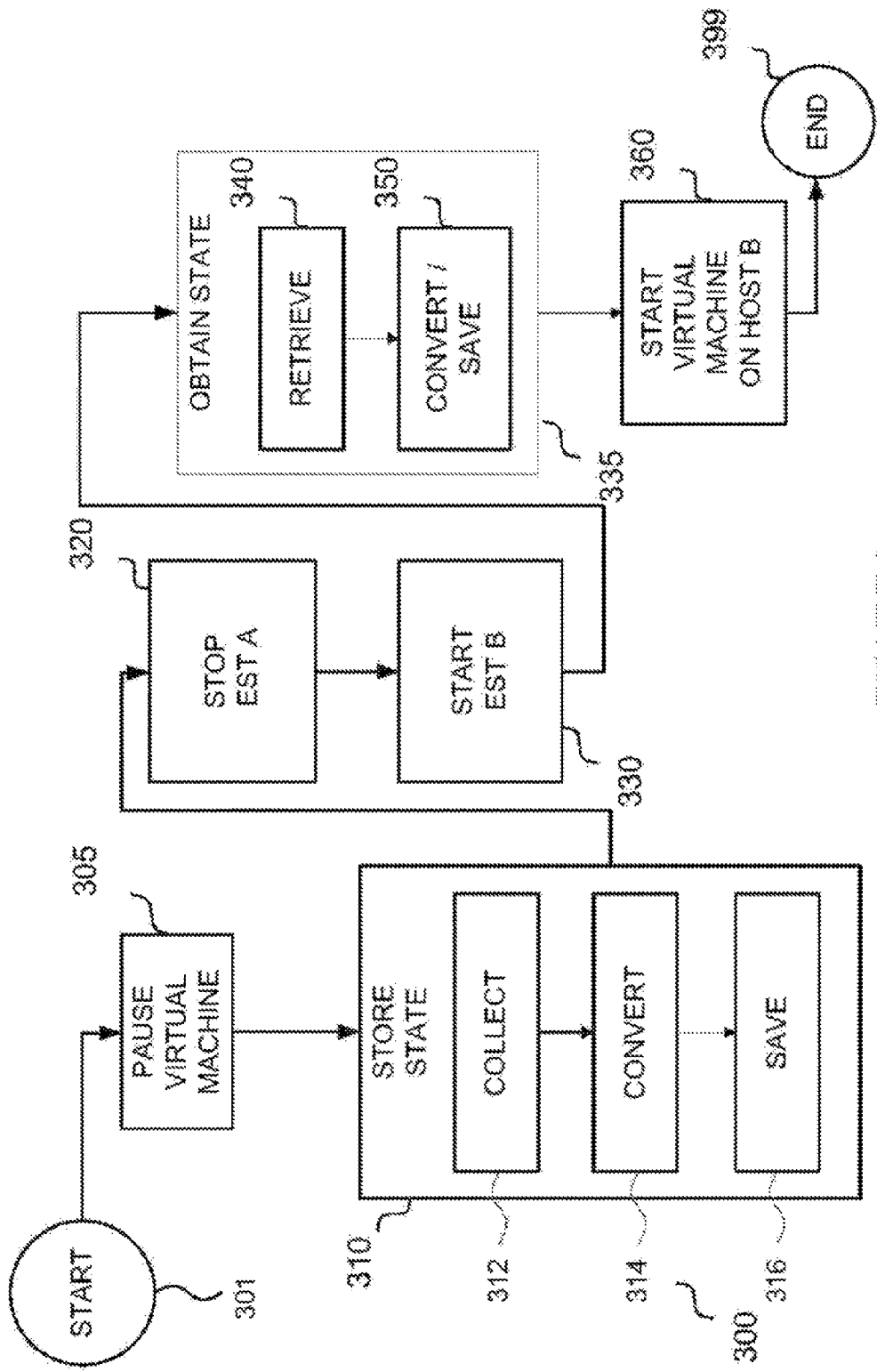
FIG. 3 is high-level flow diagram depicting exemplary operation steps for migrating a running virtual machine from one server to another server using suspend and resume, in accordance with an embodiment of the invention.
Figure 4:
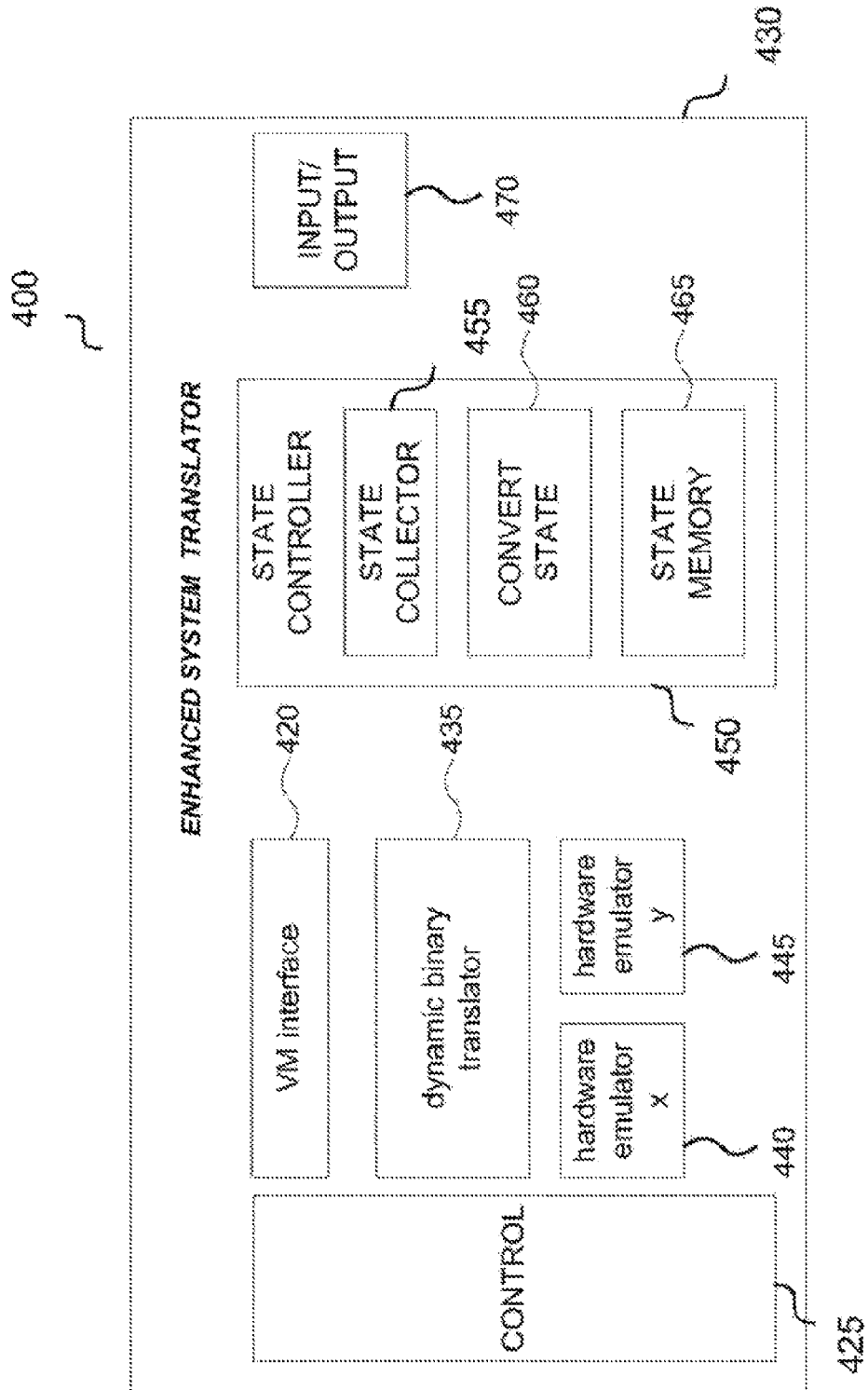
FIG. 4 is a block diagram depicting an enhanced system translator in which an embodiment of the invention may be implemented.
Figure 5:
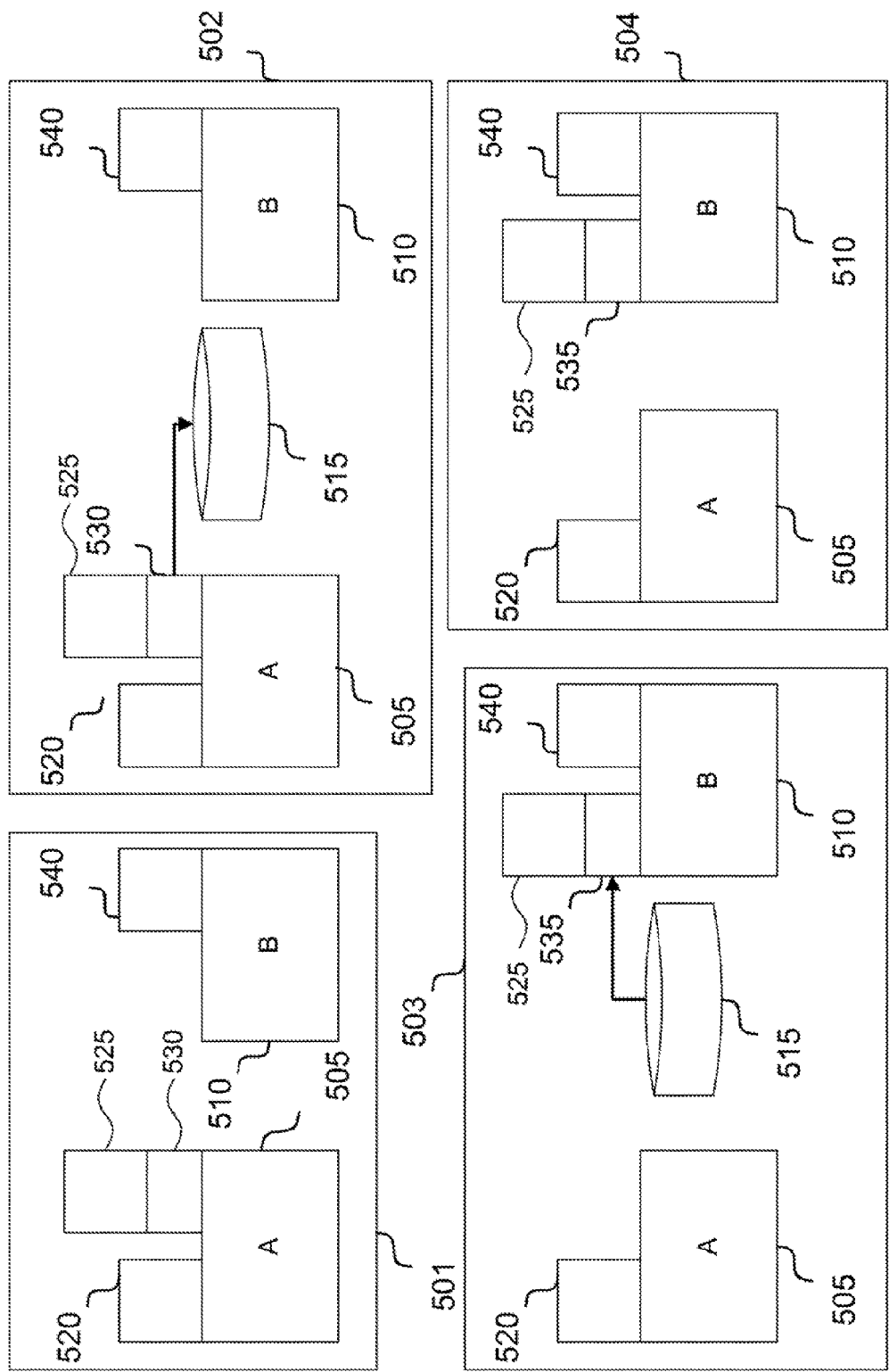
FIG. 5 is a block diagram depicting configurations of source server and target server in four configurations of the method of FIG. 3.

FIG. 3, which should be read in conjunction with FIG. 4 and FIG. 5, is a high-level exemplary schematic flow diagram 300 depicting operation method steps for migrating a running virtual machine (VM) from one server 150 to another server 160 using suspend and resume, in accordance with an embodiment of the invention. FIG. 4 is a block diagram 400 depicting an enhanced system translator (EST) 420 in which an embodiment of the invention may be Implemented. FIG. 5 is a block diagram 500 depicting configurations of source server (host A) 505, and target server (host B) 510, in four configurations 501, 502, 503, 504 of the method of FIG. 3.

The method starts at step 301 with the source server (host A) 150, 505 and target server (host B) 160, 510 in configuration 501. In an embodiment, an administrator 112 signals to host A 150, 505 and to host B 160, 510 that a first VM 525 is to be migrated. A second VM 520 also operates on host A 505, and a third VM 540 operates on host B 510. The first VM 525 is operable with a first EST 430, 530.

At step 305 in configuration 502, a control component 425 of the first EST 430, 530 pauses the first VM 525. Pausing comprises, for example, stopping the executing instructions, suspending hardware emulation and the receipt of external events such as network packets. At step 310 a state controller 450 of the first EST 430, 530 stores the state of the first VM 525. The step 310 comprises sub-steps 312, 314 and 316. At sub-step 312 a state collector 455 collects the state from the first VM 525. Examples of the state include: CPU register state; memory state; configuration and state of hardware being emulated (for example what adapters are connected and what state they are in); and, interrupt controller state (for example, interrupt level and interrupts pending). At sub-step 314, a convert state component 460 converts the collected state into ISA independent form. At sub-step 316, the independent state is saved in state memory 465 (for example in RAM), and subsequently serialised to hard disk 515 through an input/output component 470. Due to the hardware emulation layers 440, 445 available in the ESTs 530, 535, the entire state of the virtual machine can be captured.

Combined with the ability of multiple translators with dynamic binary translation, the state can be transferred to another physical machine running a different instruction set architecture.

At step 320 the controller 425 stops the first EST 430, 530. At step 330, a second EST 430, 535 is established in a paused condition on host B 510. Part of the start-up procedure of the second EST 430, 535 identifies what file to read the state data from. The first VM 525 is also established on host B 510 in a paused condition. The second EST 430, 535 is established in a condition ready to receive state from a remote location. In a paused condition no instructions or hardware emulation are run.

At step 335 in configuration 503, a state controller 450 of the second EST 430, 535 obtains the state of the first VM 525. Step 335 comprises sub-steps 340, and 350. At sub-step 340, the independent state is retrieved serially from the hard disk 515 through an input/output component 470. At sub-step 350, a convert state component 460 converts the ISA independent form into a state suitable for the ISA of host B 510.

At step 360 in configuration 504, the first VM 525 is resumed on host B 510 using the state retrieved in step 335. Resuming the first VM 525 comprises for example, initialising hardware emulation, and resuming execution of virtual CPUs and threads used for hardware emulation based on the extracted state.

The state of a VM is sufficient to fully specify the VM. Outside connectivity is not recorded. For example, the fact that a virtual network card is present is recorded, along with the state of that virtual network card, but not what it is connected to. Therefore, it is possible to restart the virtual machine even though after migration it may be connected to a different network infrastructure. The method ends at step 399.

In an embodiment, an EST 430 comprises a VM interface 420, a dynamic binary translator 435, and an appropriate hardware emulators 440, 445. Hardware emulator x 440 is operable to interface with the physical hardware 250, 252 of host A 150, 505, and hardware emulator y 445 is operable to interface with the physical hardware 250, 252 of host B 160, 510. In an embodiment, the ESTs 430 operating on the two different ISAs are different pieces of software, but providing much of the same functionality. Preferably, they share the same source code, but the actual output program that is run is different. For example, they have different hardware emulation code, different binary translator code, different ways of converting state to/from the independent format. In an alternative embodiment the EST code has the capability of emulating multiple ISAs and therefore has hardware emulators built in, which are selectable for the appropriate physical hardware.

In an alternative embodiment a fourth VM (not shown) is created on host B 510 at step 335 in a paused condition, in place of resuming the first VM 525 at step 360. The fourth VM is created as a duplicate to the first VM 525. The fourth VM acts identically, to the first VM 525, because it is started with identical state as retrieved in step 335. Once the fourth VM has been started, the first VM 525 is deleted on host A 505. In other words, migrating the first VM 525 from host A 505 to host B 510 is identical to creating an identical VM with the same state on host B 510 and deleting the first VM 525.

Figure 6:
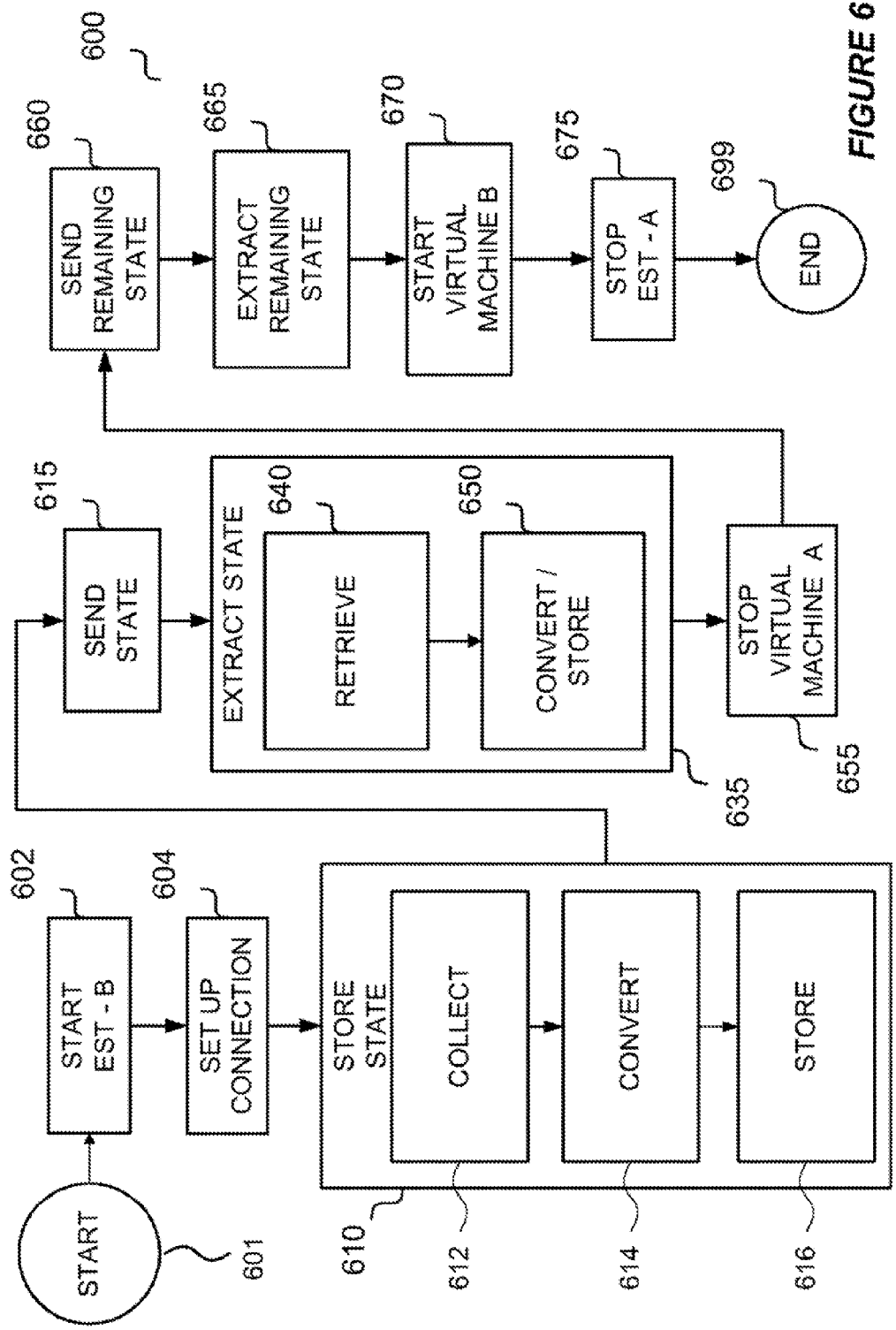
FIG. 6 is a high-level flow diagram depicting operation steps for migrating a running virtual machine from one server to another server, accordance with an embodiment of the invention.

FIG. 6, which should be read in conjunction with FIG. 4 and FIG. 7, is a high-level exemplary schematic flow diagram 600 depicting operation method steps for migrating a running virtual machine (VM) from one server 150 to another server 160, in accordance with an embodiment of the invention. FIG. 7 is a block diagram 700 depicting configurations of source server (host A) 705, and target server (host B) 710, in four stages 701, 702, 703, 704 of the method of FIG. 6.

The method starts at step 601 with the source server (host A) 150, 705 and target server (host B) 160, 710 in configuration 701. In an embodiment, a administrator 112 signals to host A 150, 705 and to host B 160, 710 that a first running VM 525 is to be migrated. A second VM 720 also operates on host A 705 and a third VM 740 operates on host B 710. The first VM 725 is operable with a first enhanced system translator (EST) 430, 730.

At step 602 in configuration 702, a second EST 430, 735 is established in a paused condition on host B 160, 710. At step 604, a network connection 110, 114, 732 is established between the first EST 430, 730 and the second EST 430, 735.

At step 610, a state controller 450 of the first-EST 430, 730 stores the state of the first VM 725. The step 610 comprises sub-steps 612, 614 and 616. At sub-step 612 a state collector 455 collects the state, from the first VM 625, At sub-step 614, a convert state component 460 converts the collected state into ISA independent form. At sub-step 616, the independent state is saved in state memory 465. At step 615, the saved independent state starts to be transferred over the network connection 110, 114, 732 to the second EST 430, 735. The state that is sent to the second EST 430, 735 comprises normal state memory contents 465 from the first physical machine. During the period that the state data is being sent, the first EST 430, 730 intercepts memory accesses allowing recording of any changes that occur after the corresponding state has already been sent. Therefore, any state changes that occur after the transfer start are noted. Cache coherency algorithms can be used to ensure that the state received at the EST 430, 735 at completion of the process is up to date.

At step 635, a state controller 450 of the second EST 430, 735 obtains the state of the first VM 725. Step 635 comprises sub-steps 640 and 650. At sub-step 640, the independent state is retrieved the network connection 110, 114, 732 through an input/output component 470. At sub-step 650, a convert state component 460 converts the ISA independent form into a state suitable for the ISA of host B 710. Transferring continues until a sufficient proportion of the state to start the VM 725 has been transferred. The proportion sufficient for operation is an optimisation of the system.

At step 655 in configuration 703, the VM 725 is stopped from operating on host A 150, 705, At step 660, the remaining state is transferred over the network connection 110, 114, 732 to EST 735. The remaining state also comprises any state changes that were made after the transfer was started in step 615. At step 665, the remaining state is extracted and saved in suitable form as in step 635. Coherency of the state changes is maintained using known cache coherency algorithms.

At step 670 in configuration 704, the VM 725 is started on host B 160, 710 using the extracted state. At step 675, the first EST 730 is stopped. The method ends at step 699.

In an alternative embodiment, a first VM 725 on host A 150, 705 is paused before state is captured and transferred over a network connection 110, 114, 732 network to host B 160, 710.

In an embodiment, to provide emulation in a machine independent way, the frontend (that is, the representation of the translated hardware as presented to the VM 525, 725) is separated from the backend (that is the mapping of the emulated hardware onto the native hardware) in the EST 530, 535, 730, 735. This allows the backend to be switched without switching the frontend. Also, as all state is kept in the frontend, this state can be moved to another architecture. Therefore, the state of the translated hardware is stored rather than the state of the native hardware. State data is also separated based on the endianness of the data. Different architectures can use different native endian formats, so interactions with the translated OS must always use the endian format native to that OS and the hardware being emulated. Interactions with physical hardware must always use the endian format expected by that hardware. Hardware emulation keeps certain parameters and values in the format native to the physical hardware rather than the emulated hardware. Therefore, to move the state to another architecture, the parameters and values must be kept separate and the endianness known.

In an alternative embodiment of the invention, state is stored at host A 510, 710 and transmitted to host B 705, 705 in the state suitable for host A 505, 705. At step 335 and 635, the state is converted to the form suitable for host B 510, 710. In an alternative embodiment of the invention, state is stored at host A 510, 710 and transmitted to host B 705, 705 in the state suitable for host B 505, 705. At step 335 and 635, there is no need to convert the state as it is already in the form suitable for host B 510, 710.

In an alternative embodiment of the invention, the methods are used to transfer state from a hypervisor 266 to an EST 530, 535, 730, 735. This would allow moving a virtual machine manning on its own native architecture to that of a different architecture: for example moving an x86-64 VM operating on an x86-64 physical host to an EST running on a POWERS, physical machine. In an alternative embodiment of the invention, the methods are used to transfer state from an EST 530, 535, 730, 735 to a hypervisor 266.

FIGS. 3 and 6 are set forth as a logical flow chart diagram. As such, the depicted order and labelled steps are indicative of one embodiment of the presented method. Other steps and methods may be conceived that are equivalent in function, logic, or effect of one or more steps or portions thereof of the illustrated method. Additionally the format and symbols employed are provided to explain the logical steps of the method and are understood not to limit the scope of the method.

The use of two ESTs allow movement of a virtual machine from one ISA to another. The two ESTs understand and accept the same VM state. The VM state from one ISA is stored and communicated in an architecture-independent and endian-independent manner. The ESTs are designed to operate on multiple architectures, such that the frontend (guest) emulation is separated from the mapping to the backend (host). Without this separation it would be difficult to extract the virtual machine state in a system-independent manner.

In an alternative embodiment of the invention, control of the system and methods provided externally to the ESTs 530, 535, 730, 735, for example by software components on the physical machines 150, 160. It will be appreciated by those skilled in the art that the trigger to the EST 530, 535, 730, 735 to initiate the migration could be achieved through many different mechanisms, for example, from a maintenance control program 118 operable on workstation 115, or a control program 134, 138.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures.

It will be clear to one skilled in the art that the method of the present invention may suitably be embodied in a logic apparatus comprising logic means to perform the steps of the method, and that such logic means may comprise hardware components or firmware components.

It will be appreciated that the method described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology present or future, including but not limited to optical, infrared or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

As will be appreciated by one skilled in the art, aspects of the present invention may be embodied as a method, system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless wireline optical fiber cable RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), Ethernet, SCSI, iSCSI, Fibre Channel, Fibre Channel over Ethernet, and Infiniband, or the connection may be made to an external computer, for example, through the Internet using an Internet Service Provider.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described above illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product to transfer a virtual machine from a first server to a second server, comprising a computer readable storage device having computer readable program code executed to perform operations, the operations comprising:

executing, by a first server implemented in a first physical machine implementing a first instruction set architecture, a first enhanced system translator executed on the first server, wherein the first enhanced system translator includes a first virtual machine interface to interface with a first instance of the virtual machine on the first server, a first convert state component, and a first hardware emulator to emulate hardware of the first server to the first instance of the virtual machine;

executing, by a second physical machine implementing a second instruction set architecture and second server, a second enhanced system translator on the second server, wherein the second enhanced system translator includes a second virtual machine interface to interface with a second instance of the virtual machine, a second convert state component, and a second hardware emulator to emulate hardware of the second server to the second instance of the virtual machine;

collecting a first state of the first instance of the virtual machine in the first instruction set architecture;

converting, by the first convert state component, the first state of the first instance of the virtual machine to an independent state in an instruction set architecture independent form; and storing, by the first enhanced system translator, the independent state for retrieval by the second enhanced system translator; and retrieving, by the second convert state component, the independent state to convert into a second state compatible with the second instruction set architecture for use by the second instance of the virtual machine to run on the second server.

2. The computer program product of claim 1, wherein the first and second enhanced system translators have different code for the first and second hardware emulators, and different code for the first and second convert state components.

3. The computer program product of claim 1, wherein the first and second enhanced system translators each have the first and second hardware emulators, wherein the operations further comprise:
  selecting, by the first enhanced system translator, the first hardware emulator to use to emulate the hardware of the first server to the first instance of the virtual machine; and
  selecting, by the second enhanced system translator, the second hardware emulator to use to emulate the hardware of the second server to the second instance of the virtual machine.

4. The computer program product of claim 1, wherein the operations further comprise:
  in response to pausing the first instance of the virtual machine, storing the first state of the first instance of the virtual machine in a state memory;
  stopping the first enhanced system translator after collecting and storing the independent state of the first instance of the virtual machine;
  establishing the second enhanced system translator on the second server in a paused condition in response to stopping the first enhanced system translator; and
  establish the second instance of the virtual machine on the second server in a paused state to receive the independent state.

5. The computer program product of claim 4, wherein the operations further comprise:
  obtaining, by the second enhanced system translator, the independent state; and
  recording, by the first enhanced system translator, state changes at the first instance of the virtual machine while the independent state is being sent to the second enhanced system translator.

6. The computer program product of claim 5, wherein the operations further comprise:
  stopping the first instance of the virtual machine after converting the first state;
  transferring the recorded state changes to the second enhanced system translator;
  extracting the recorded state changes;
  starting the second instance of the virtual machine on the second server after extracting the recorded state changes; and
  stopping the first enhanced system translator in response to starting the second instance of the virtual machine.

7. The computer program product of claim 1, wherein the first state and the second state is a member of a set of states comprising a state of emulated hardware on the first instance of the virtual machine including at least one of Central Processing Unit (CPU) register state, memory state, configuration and state of hardware being emulated, and an interrupt controller state.

8. A system for transferring a virtual machine, comprising:
  a first physical machine implementing a first instruction set architecture and a first server to execute a first enhanced system translator including a first virtual machine interface to interface with a first instance of the virtual machine on the first server, a first convert state component, and a first hardware emulator to emulate hardware of the first server to the first instance of the virtual machine;
  a second physical machine implementing a second instruction set architecture and a second server to execute a second enhanced system translator including a second virtual machine interface to interface with a second instance of the virtual machine, a second convert state component, and a second hardware emulator to emulate hardware of the second server to the second instance of the virtual machine;
  wherein the first convert state component performs:
    collecting a first state of the first instance of the virtual machine in the first instruction set architecture;
    converting the first state of the first instance of the virtual machine to an independent state in an instruction set architecture independent form; and
    storing the independent state for retrieval by the second enhanced system translator; and
  wherein the second convert state component retrieves the independent state and converts into a second state compatible with the second instruction set architecture for use by the second instance of the virtual machine to run on the second server.

9. The system of claim 8, wherein the first and second enhanced system translators each have the first and second hardware emulators, wherein the first enhanced system translator selects the first hardware emulator to use to emulate the hardware of the first server to the first instance of the virtual machine and wherein the second enhanced system translator converts the second hardware emulator to use to emulate the hardware of the second server to the second instance of the virtual machine.

10. The system of claim 8, wherein in response to pausing the first instance of the virtual machine, the first enhanced system translator stores the first state of the first instance of the virtual machine in a state memory and stops after collecting and storing the independent state of the first instance of the virtual machine, and wherein the second enhanced system translator is established on the second server in a paused condition in response to stopping the first enhanced system translator, and wherein the second instance of the virtual machine is established on the second server in a paused state to receive the independent state.

11. The system of claim 10, wherein the first enhanced system translator records state changes at the first instance of the virtual machine while the independent state is being sent to the second enhanced system translator, wherein the second enhanced system translator obtains the independent state.

12. The system of claim 11, wherein the first instance of the virtual machine is stopped after converting the first state, wherein the recorded state changes are transferred to the second enhanced system translator to extract the recorded state changes, wherein the second instance of the virtual machine is started on the second server after extracting the recorded state changes, and wherein the first enhanced system translator is stopped in response to starting the second instance of the virtual machine.

13. A method for transferring a virtual machine from a first server to a second server, comprising:
  executing, by a first physical machine implementing a first instruction set architecture and a first server, a first enhanced system translator executed on the first server, wherein the first enhanced system translator includes a first virtual machine interface to interface with a first instance of a virtual machine on the first server, a first convert state component, and a first hardware emulator to emulate hardware of the first server to the first instance of the virtual machine;

executing, by a second physical machine implementing a second instruction set architecture and second server, a second enhanced system translator on the second server, wherein the second enhanced system translator includes a second virtual machine interface to interface with a second instance of the virtual machine, a second convert state component, and a second hardware emulator to emulate hardware of the second server to the second instance of the virtual machine;

converting, by the first convert state component, first state of the first instance of the virtual machine to an independent state in an instruction set architecture independent form;

storing, by the first enhanced system translator, the independent state for retrieval by the second enhanced system translator; and retrieving, by the second convert state component, the independent state to convert into a second state compatible with the to a second instruction set architecture for use by the second instance of the virtual machine to run on the second server.

14. The method of claim 13, wherein the first and second enhanced system translators each have the first and second hardware emulators, further comprising:

selecting, by the first enhanced system translator, the first hardware emulator to use to emulate the hardware of the first server to the first instance of the virtual machine; and selecting, by the second enhanced system translator, the second hardware emulator to use to emulate the hardware of the second server to the second instance of the virtual machine.

15. The method of claim 13, further comprising:

in response to pausing the first instance of the virtual machine, storing the first state of the first instance of the virtual machine in a state memory;

stopping the first enhanced system translator after collecting and storing the independent state of the first instance of the virtual machine;

establishing the second enhanced system translator on the second server in a paused condition in response to stopping the first enhanced system translator; and establish the second instance of the virtual machine on the second server in a paused state to receive the independent state.

16. The method of claim 15, further comprising:

obtaining, by the second enhanced system translator, the independent state; and recording, by the first enhanced system translator, state changes at the first instance of the virtual machine while the independent state is being sent to the second enhanced system translator.

17. The method of claim 16, further comprising:

stopping the first instance of the virtual machine after converting the first state;

transferring the recorded state changes to the second enhanced system translator;

extracting the recorded state changes;

starting the second instance of the virtual machine on the second server after extracting the recorded state changes; and stopping the first enhanced system translator in response to starting the second instance of the virtual machine.

* * * * *